(12) United States Patent
Han et al.

(10) Patent No.: US 8,525,844 B2
(45) Date of Patent: Sep. 3, 2013

(54) DISPLAY UPDATE FOR A WIRELESS DISPLAY DEVICE

(75) Inventors: Kyungtae Han, Portland, OR (US); Guoqing C. Li, Portland, OR (US); Sumit K. Singh, Santa Barbara, CA (US)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 12/489,746

(22) Filed: Jun. 23, 2009

(65) Prior Publication Data

US 2010/0321402 A1 Dec. 23, 2010

(51) Int. Cl.
G09G 5/36 (2006.01)
G06T 1/60 (2006.01)

(52) U.S. Cl.
USPC .......................................... 345/545; 345/530

(58) Field of Classification Search
USPC .................................. 345/530, 541, 542, 545
See application file for complete search history.

(56) References Cited

U.S. PATENT DOCUMENTS 7,616,208 B2 * 11/2009 Lauder .......................... 345/530
2002/0030688 A1 * 3/2002 Shimomura et al. .......... 345/542
2008/0174606 A1 * 7/2008 Rengarajan et al. .......... 345/531

OTHER PUBLICATIONS

Brakmo, Lawrence S, et al., "μSleep: A technique for reducing energy consumption in handheld devices", *Proc. Int. Conf. Mobile Systems, Applications, and Services*, (2004), 12-22.

* cited by examiner

*Primary Examiner* — Jacinta M Crawford
(74) *Attorney, Agent, or Firm* — Schwegman, Lundberg & Woessner, P.A.

(57) ABSTRACT

Embodiments of partial update for a wireless display device include providing an update information message identifying a location of the partial update and the changed image data. A display source identifies changes in image data stored in a frame buffer, generates an update information message to identify the location of the changed image data and to provide the changed image data. A display sink receives the update information message and merges the changed image data with image data stored in a local frame buffer.

18 Claims, 7 Drawing Sheets

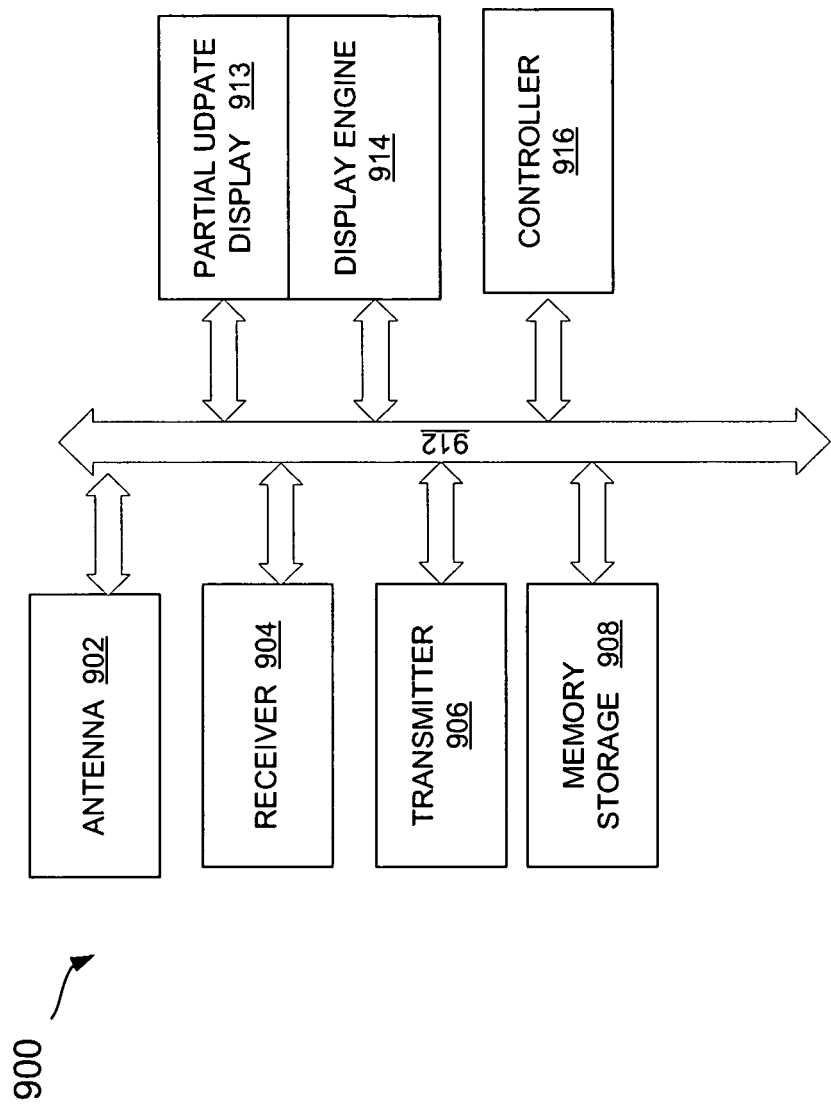

DISPLAY UPDATE FOR A WIRELESS DISPLAY DEVICE

TECHNICAL FIELD

Some embodiments pertain to wireless communications. Some embodiments pertain to a display update for a wireless display device.

BACKGROUND

Wireless capability allows a variety of devices to communicate with each other adding to the mobility of users. A computing device, such as a Personal Computer (PC), may be used with various peripherals which are not wired together, but rather communicate using wireless communications, such as Wireless Local Area Network (WLAN) type protocols. As operations are performed by the PC, changes to information for display are sent to a wireless display device.

BRIEF DESCRIPTION OF THE DRAWINGS

FIG. 9 illustrates, in block diagram format, a computing system for implementing updates to a display device, in accordance with example embodiments.

DETAILED DESCRIPTION

Figure 1:
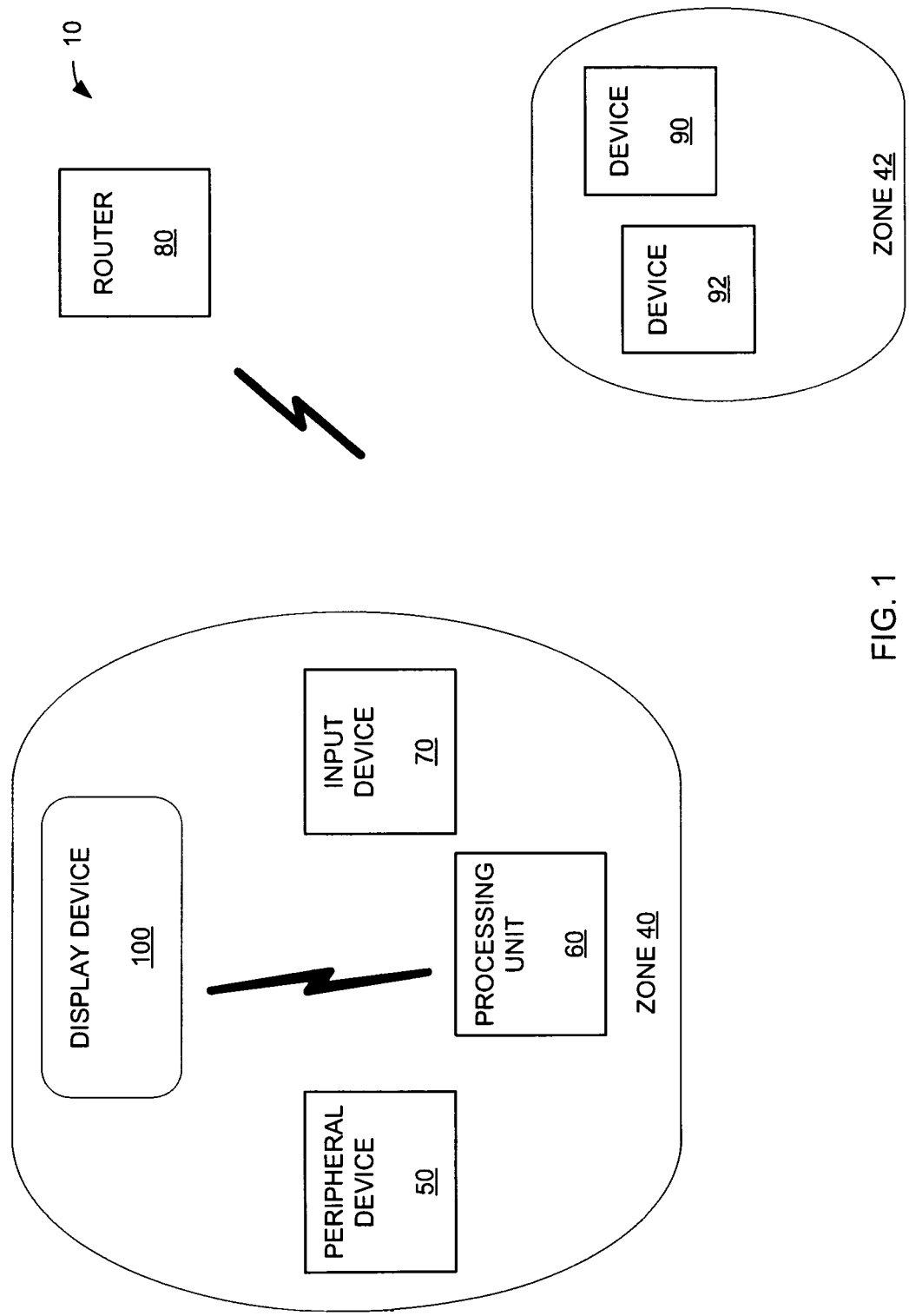
FIG. 1 illustrates a Wireless Area Network (WLAN) including a wireless display device, in accordance with example embodiments.

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

WLAN protocols and devices enable mobility and flexibility in computing systems, where devices and components may be implemented using wireless technology. For example, a PC may include a wireless processing unit, a wireless keyboard, a wireless mouse, and a wireless display. The PC then sends wireless signals to a display or other unit, thus reducing the wired connections of a system. Wireless signals enable the flexibility of the system, however, such systems often have specific Quality of Service (QoS) requirements.

In a wireless communication system using a 60 GHz, such as a Wireless Personal Area Network (WPAN), which is a network for interconnecting devices around an individual person's workspace using a wireless protocol, for example a Bluetooth protocol, as defined by the IEEE 802.15, or the Wi-FI protocol, as defined by the IEEE 802.11.

A system using 60 GHz signaling enables multi-Gigabit wireless applications over short distances, for example a wireless docking system. Wireless PC displays are typically constrained by QoS requirements which specify minimum data rate and maximum delay. Although the use of 60 GHz radio frequency signaling supports multi-Gigabit data rates, wireless displays typically share network resources with other wireless devices and applications. Further challenges to implementation of a WPAN include congested deployment scenarios, such as office cubicle configurations and multiple WPANs in close proximity. Additionally, the use of wireless communications adds to the power consumption of devices and components of the WPAN. Design of such systems involves optimizing the amount of data transmitted using the wireless communications.

In one example, a PC continuously reads video pixels from a frame buffer and transmits these pixels through an interface protocol to the display unit. The interface protocol may be such as High-Definition Multimedia Interface (HDMI), and Mobile Industry Processor Interface (MIPI) Display Serial Interface (DSI), regardless of the content of the display data. In a system providing continuous frame buffer data, much of the information transmitted is redundant data, as PC display data has a high static content over regular use. In other words, much of the information stored for display does not change from one frame to the next. Further, when the PC is idle, there is no need to transmit display data, as the data to display is not changing. Therefore, the display unit may "self-refresh" by simply displaying the previous frame again. Similarly, there are times during PC operation when the display information does not change, such as when a user is typing, or using certain PC applications. In these situations, a large portion of the screen display may be static, in contrast to video applications with fast content changes. By providing update information on changes to the display information, some embodiments result in conservation of bandwidth and reduction in power consumption associated with wireless communications. One example sends update information indicating that portion of the display image that is to change. This update information is referred to as a "partial update." Rather than sending the complete pixel information, which may include a significant amount of redundant information, an example system sends update information to reduce bandwidth and conserve transmit power.

FIG. 1 illustrates a WLAN including a wireless display device, in accordance with example embodiments. The system 10 includes a wireless router 80 in communication with several WPANs, including zone 40 and zone 42. Within Zone 40 a processing unit 60 communicates with a display device 100. Both the processing unit 60 and the display device 100 support wireless communications, and specifically enable a 60 GHz link. The zone 40 may also include any number of other devices, either wired or wireless, including input device 70 and peripheral device 50. The zone 42 includes device 90 and device 92, which also communicate with router 80.

Figure 2:
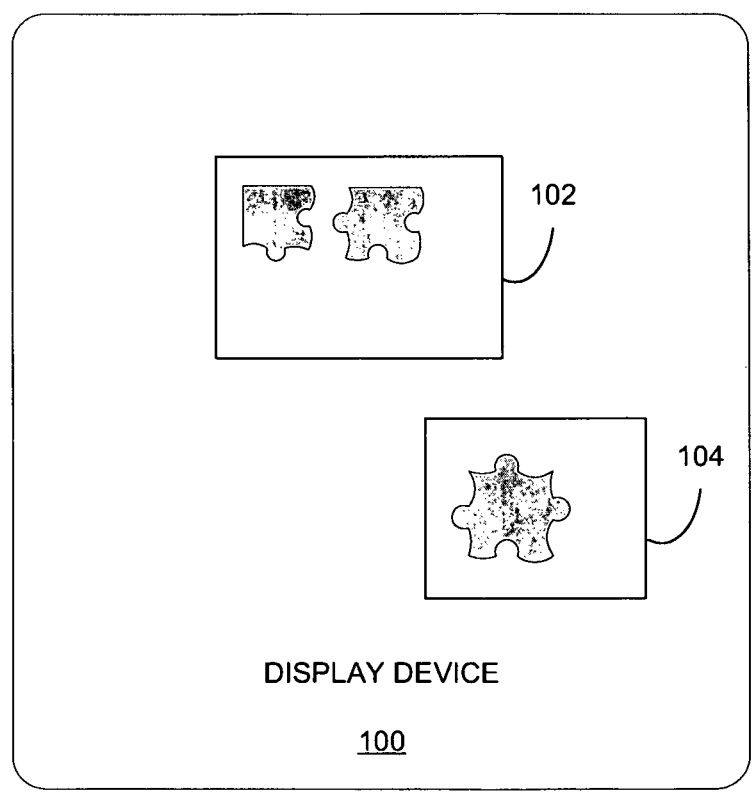
FIG. 2 illustrates, in block diagram format, a display device, in accordance with example embodiments.

FIG. 2 illustrates, in block diagram format, a display device 100, in accordance with example embodiments. The display device 100 is illustrated after an update to the display image.

At the time of the update, there was no change to a large portion of the display image. The changed portions of the display image include two areas, identified by blocks 102, 104, each including an updated display image. The other portions of the display device 100 remain unchanged. To implement the changed image portion, blocks 102, 104, the display device receives the update information and merges the new information with the unchanged portions.

Figure 3:
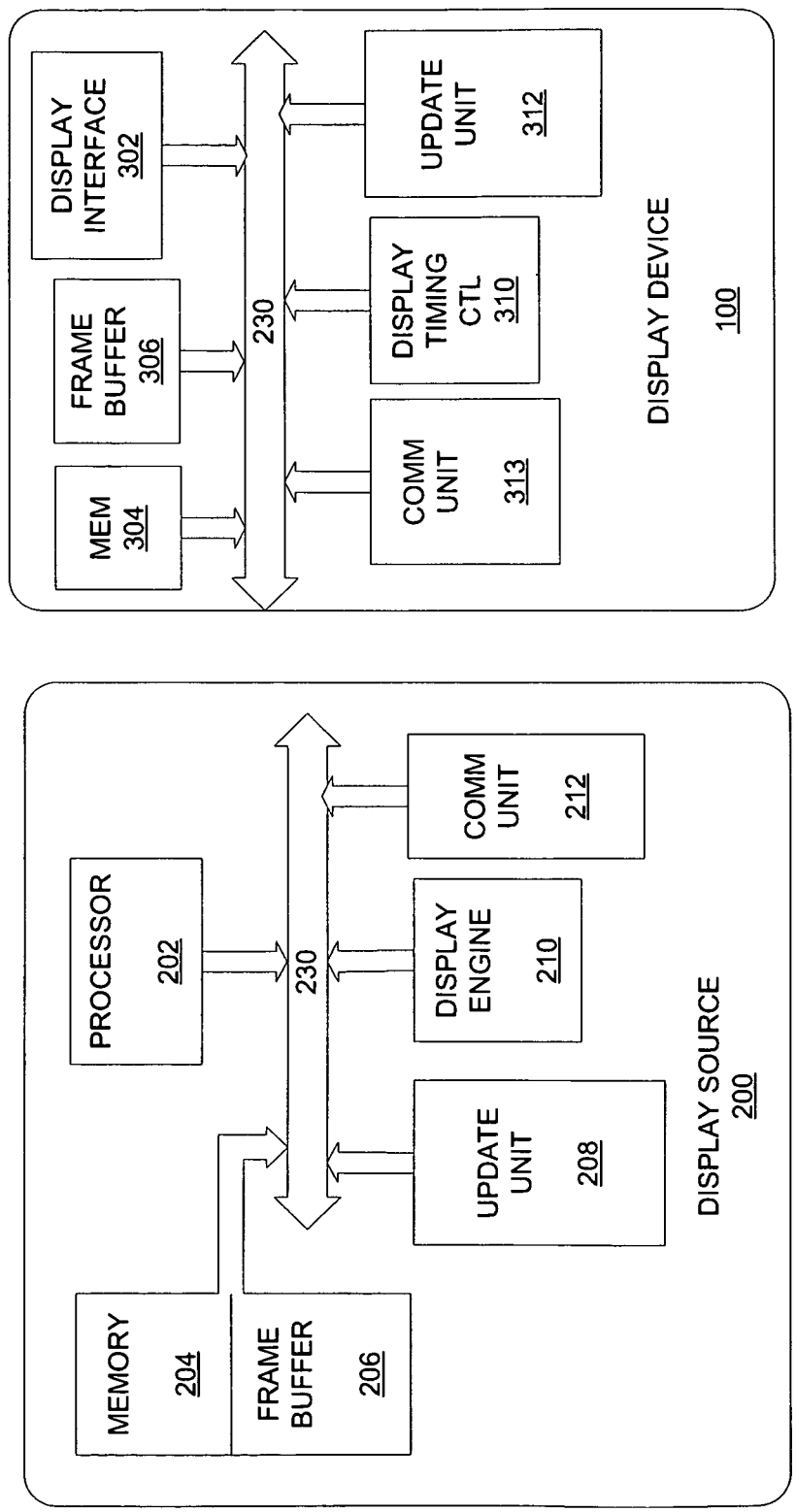
FIG. 3 illustrates, in block diagram format, a computing system having a display source and a display sink, in accordance with example embodiments.

FIG. 3 illustrates, in block diagram format, a computing system having a display source 200 and a display device 100, in accordance with example embodiments. The display source 200 includes a processor 202 communicating with various modules via a communication bus 230. The display source 200 includes a display engine 210, a communication unit 212 and memory 204. The display source 200 further includes an update unit 208 to identify updates to the image data and provide such to display engine 210. The display data is stored in the frame buffer 206.

The update unit 208 identifies the changed portions in a current frame as compared to a previous frame. The changed portions may be identified by a shape or organization of information on the display, such as a rectangle or square of information. The communication unit 212 implements a protocol to enable communication between the display source 200 and the display device 100. The protocol defines control message formats to be used for partial updates from the update unit 208.

The display device 100 includes a communication unit 312 to receive information from the display source 200, as well as from other wireless devices in a WPAN. Frame information is received and stored in the frame buffer 306, while the update unit 312 receives the update information and applies to the display interface 302. The display is controlled by a display timing control 310.

The display device 100 may be any of a variety of displays, such as a widescreen Light Crystal Display (LCD) monitor. The update unit 212 interfaces with the communication unit 312 at the display device 100. The update unit 212 interprets changes from the previous frame based on the update information received from the display source 200. The update unit 212 merges the changed blocks of display image received as update information with the unchanged portions of the previous frame as stored in the frame buffer 306. The combination creates a current display image, which is then displayed under control of the display timing controller 310.

The partial display update information consists of the location and size of the changed rectangular regions/blocks of the display image, along with the new pixel information corresponding to these blocks. This information can be obtained in the following two ways:

The update information may be considered partial display update information, and is obtained by way of a data and control communication path between frame buffer 206, which may be included as part of the main memory 204 or may be maintained separately, and the display engine 210. In one example, the display engine 210 contains display information over three image planes. The image planes are blended together and transmitted to the external display device 100. In wired communications, various protocols are available, including the display interface such as Low-Voltage Differential Signaling (LVDS) and others, wherein the image planes include a main plane, a cursor plane and an overlay plane. The main plane includes information for displaying the background of the display image. The cursor plane includes information for implementing responses to hardware control, such as cursor control, on the display image. The overlay plane includes media data, such as video applications, for display, such as Media Player data running on a PC.

In one embodiment, a display engine 210 continuously reads video pixels from frame buffer 206 and transmits the retrieved video pixels through a communication unit 212 using a wireless interface protocol. The video pixels may be stored in the frame buffer 206 as part of a complete video product, such as a movie, or video components that are displayed as part of a software application processed by processor 202.

In operation, the display source 200 the display engine 210 retrieves data from the frame buffer 206. In one embodiment, the display data is stored in the frame buffer 206, including the three image planes. In some embodiments the update unit 208 intercepts the data from the frame buffer 206 prior to provision by the display engine 210 to send the information to the display device 100. The update unit 208 identifies update information corresponding to changed portions of the display and organizes the update information according to changed blocks of the display image. The update information, which is a portion of the display information, is then sent to the communication unit 212, which may include multiple communication layers, such as Protocol Adaptation Layer (PAL) that wraps the information with the PAL headers for transmission. The communication unit 212 then transmits the data to the display device, such as through a 60 GHz radio link.

In one embodiment, the update unit 208 calculates a difference between a current display frame and a previous display frame stored in the frame buffer 204, and selectively sends this information to the display device 100. In one embodiment, the update unit 208 uses a threshold to compare frames of display data. Each frame of display data is stored in the frame buffer and may be received from external to the display source 200, such as a streaming video or Digital Video Disc (DVD), or may be retrieved from information stored within memory 204.

Figure 4:
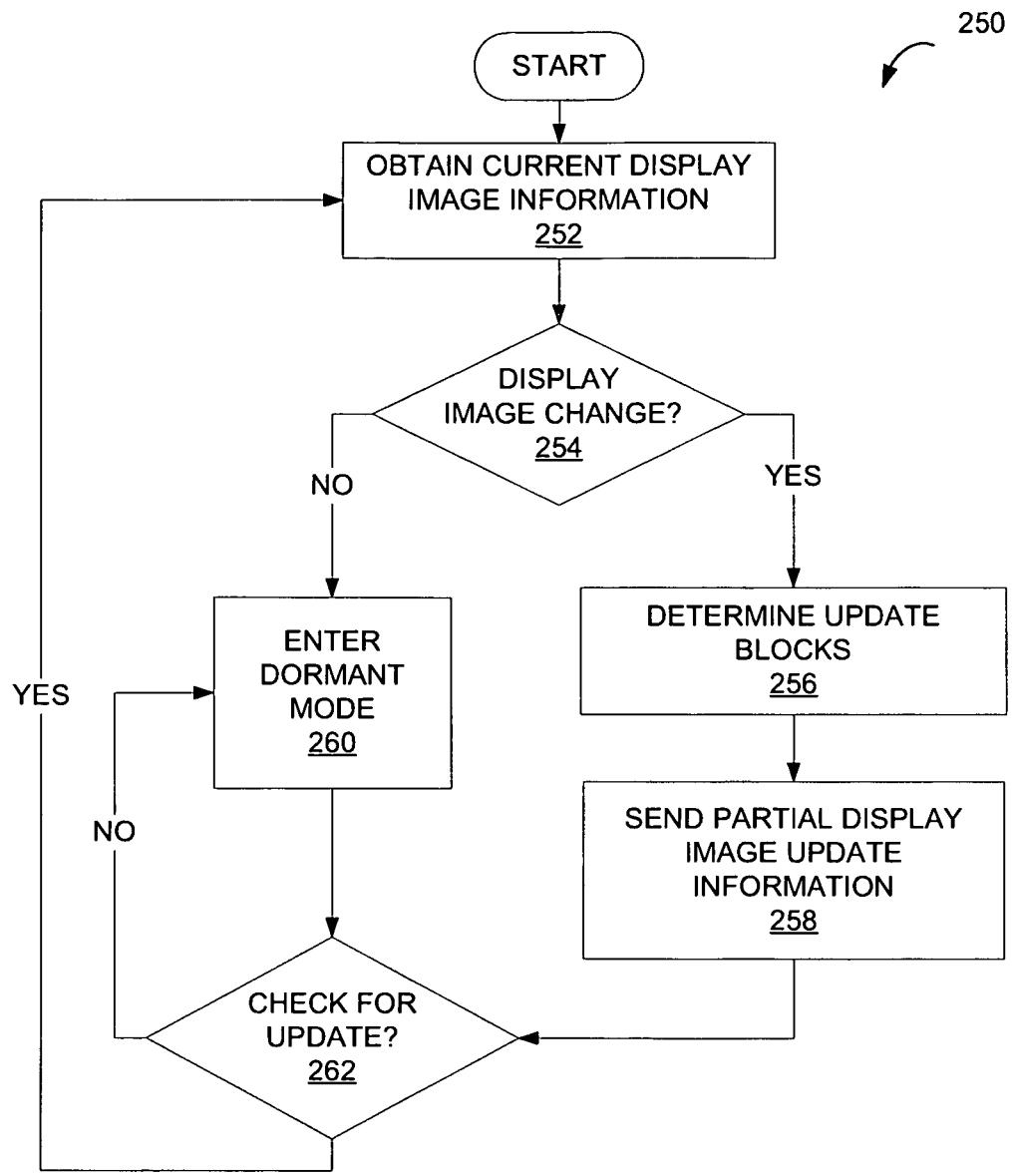
FIG. 4 illustrates, in flow diagram format, a method for updating a display in a computing system, in accordance with example embodiments.

FIG. 4 illustrates, in flow diagram format, a method for updating a display in a computing system, in accordance with example embodiments. The processing of the display source 200 is illustrated in the method 250, which involves activities to obtain 252 current display image information. The current display information is for a current or next frame for display. The display source 200 then determines 254 if the display image has changed. The display source 200 compares the current display frame to a previous display frame to identify differences. When there are no differences, and the display frame remains the same, portions of the display source 200 or display device 100 may enter a dormant mode for energy conservation. When the current frame is different from the previous frame, the method 250 includes activities to determine 256 the update blocks. In one embodiment, the update unit 212 determines the location and size of the block to describe a portion of the display frame, wherein the size of the block may vary. In some embodiments, the size of the block is fixed, wherein the display image includes a predetermined number of blocks at predetermined locations. The display source 200 then sends 258 the partial display image update information to the display device 100. By checking 262 for an update, the display source 200 either enters 260 (or remains in) a dormant mode, or obtains 252 the current display image information.

Figure 5:
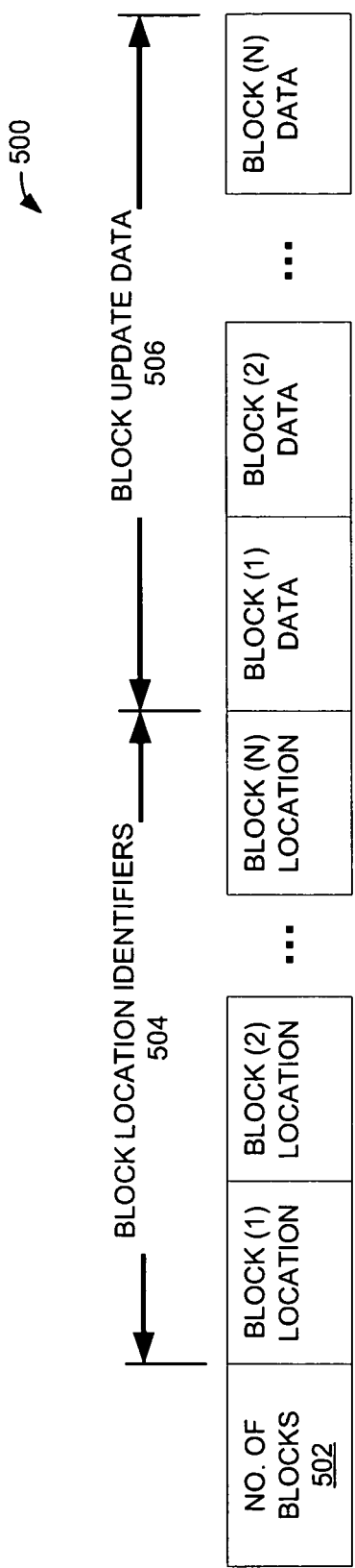
FIGS. 5-7 illustrate, in block diagram format, display update messages, in accordance with example embodiments.
Figure 6:
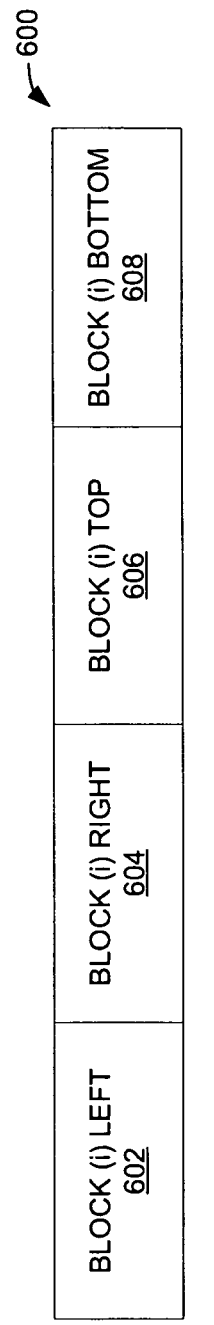
Figure 7:
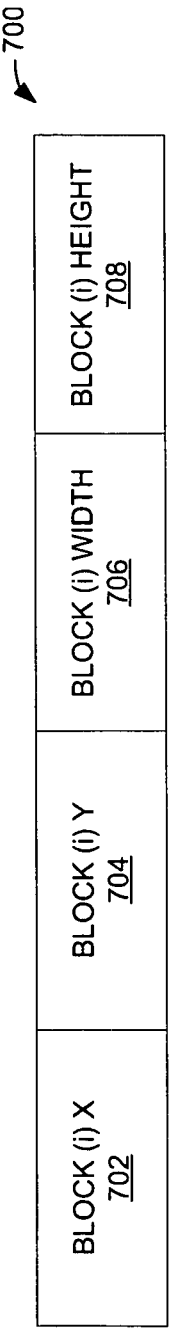

FIGS. 5-7 illustrate, in block diagram format, display update messages, in accordance with example embodiments. The partial display update information includes information identifying a location of the changed information, or update information, and the corresponding update information. The location may be identified by a position, such as coordinates of a location on the screen, and a size of changed rectangular regions, referred to as a block, of the display screen. The update information may be new pixel information for an image display corresponding to the identified block(s). The update information may be any of a variety of formats which allow provision of information to present the display image on the display screen. The location information may identify a changed region having a shape other than a rectangular shape, such as octagonal or overlapping spheres, and so forth.

The partial display update information, both the location information and the update data can be obtained a variety of ways. In a first method, partial display update information is obtained from the data/control path between the frame buffer 206 of FIG. 2 and the display engine 210. The display information includes information taken over three image planes blended together and then transmitted to the external display device 100. The three (3) planes include a main plane with the full background screen information, a cursor plane with the hardware cursor information, and an overlay plane in case of natural video applications such as Media Player running on the PC. The method includes activities including to intercept the display data from the frame buffer 206 in the main memory 204 to the display engine 210; and further to glean the information related to the partial update display and changed block(s) via a update unit 208. At least some of the functions of the update unit 208 may be similar to a display driver, and may be implemented in computer-readable instructions, such as a software implementation coordinated with display related programs. The update unit 208 detects the partial update information. The partial display update information is provided to the communication unit 212, which in one example applies a PAL type header and transmit it to the display device 100 through a 60 GHz radio link.

In a second method, partial update detection is implemented at the output port or a display source, such as display source 200 of FIG. 2. An update unit 208 calculates a difference between a current display image and the previous display image. The display image corresponds to a display frame, such as the frame data stored in a frame buffer 206. The update unit 208 selectively sends the display difference information to the display sink, such as display device 100. The display difference information is sent via Wi-Fi connection, such as using a 60 GHz radio signal. While the first method provides a quicker solution for updating the display image(s), the latter method introduces a minimal change in a Personal Computer (PC), graphics hardware or other hardware architecture.

FIG. 5 illustrates a message format for providing display update information from the display source 200 to the display device 100. The message format 500 includes a plurality of fields, including a number of blocks field 502, which identifies the number of blocks for which update information is provided for the current frame of display data. The message format 500 includes a first set of block location identifiers 504 and a second set of block update data 506. The block location identifiers 504 include at least one field to identify a location for display of a block of update data. In one embodiment, the block location identifier 504 comprises one field identifying a specific location on the display. Such as where the display screen is divided into a plurality of squares or rectangles, each having a unique identifier. In such embodiment, the block location identifier 504 is used to store the unique identifier. In some examples, the block location identifier includes multiple fields, such as illustrated in FIG. 6 and FIG. 7, described herein.

Each block location identifier 504 includes an index to correlate the block location identifier 504 with data for stored in block data 506 having the same index value. For example, consider a block location identifier 504 having an index value N corresponds to block data 506 having the same index value. In other words, data stored in block data 506 having the index value N describes the display data for the location identified by block location identifier 506 having index value N.

The block update data 506 includes at least one field to provide the current data or update data for the corresponding block location. The message format 500 may be provided according to an interface protocol, such as a High-Definition Multimedia Interface (HDMI) protocol. In one example, the value stored in block data 506 stores the current data for display. In some embodiments, the value stored in block data 506 stores a delta value to provide an incremental change in the data to be displayed.

As illustrated in FIG. 6, the block location identifiers 504 implement a scheme using four (4) points to identify the location of a block. The block location identifiers 504 are provided in a format 600, which includes a block left field 602, a block right field 604, a block top field 606 and a block bottom field 608. Each of the fields of format 600 has an index value correlating to the block data for the block.

FIG. 7 illustrates an example of a format 700 for a block location identifier 504, which uses coordinates of the location of a block on the display screen. A block X field 702 and a block Y field 704 correspond to x-y coordinate measurements. The coordinate measurements allow identification of a first position on the display screen. Further, block width field 706 and block height field 708 then define the size and shape of the block.

Using some of the methods described herein or other example embodiments for identifying a location, size and shape of the block, which may change dynamically over time, or in response to historical data. For example, it may be desirable to rotate or change the display portion of the screen. Similarly, the shapes may overlap.

In one embodiment, information for an audio or video may be an optional feature, wherein the device source 200 is able to provide continuous frame data and is further able to provide the updated information. In some situations, where display images change quickly, the display information is provided continuously, as only a small portion of the display image remains the same. In other situations, where display image changes are sporadic, the device source implements the update techniques. A device supporting partial updates of display image data indicates such capability during a discovery phase in 60 GHz WPANs. The partial update capability may be broadcast to devices within the WPAN.

Figure 8:
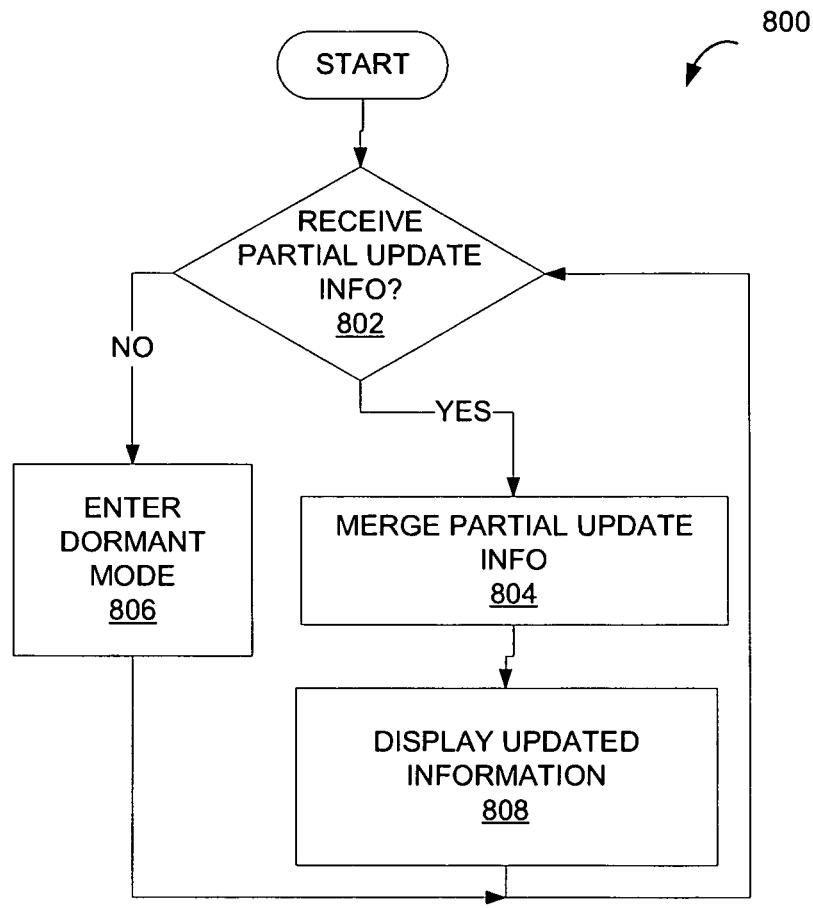
FIG. 8 illustrates, in flow diagram format, a method for implementing updates to a display device, in accordance with example embodiments.

FIG. 8 illustrates, in flow diagram format, a method for implementing updates to a display device, in accordance with example embodiments. The method includes activities to determine 802 if partial update information has been received. When there is partial update information, processing continues to merge 804 partial update information into the display data. The display device then displays 808 the updated information. If there is no partial update information, the modules within the display source and display device may enter a dormant mode or other low power mode, as there are no changes to implement. Processing then returns to await a next partial update.

FIG. 9 illustrates, in block diagram format, a computing system for implementing updates to a display device, in accordance with example embodiments. The computing system 900 implements a partial display update process, in accordance with example embodiments. The computing system 900 includes a receiver 904, a transmitter 906, an antenna 902 and memory storage 908. The receiver 904 and transmitter 906 may be a single transceiver unit for wireless communication. The computing system 900 further includes a registration engine 912 enabling the computing system 900 to implement a partial display update process according to some embodiments. A display engine 914 enables operation for controlling display including extraction of partial update information, as well as a controller 916 provides control and enables operations within the computing system 300. A communication bus 912 enables communications for the various modules of the computing system 900.

In some embodiments, receiver 904 may be configured to receive Orthogonal Frequency-Division Multiplex (OFDM) communication signals over a multicarrier communication channel. The OFDM signals may comprise a plurality of orthogonal subcarriers. In some of these multicarrier embodiments, receiver 904 may be part of a Wireless Local Area Networks (WLANs) communication station such as a Wireless Access Point (WAP), base station or a mobile device including a Wireless-Fidelity (Wi-Fi) device. In some broadband multicarrier embodiments, a base station may be part of a Broadband Wireless Access (BWA) network communication station, such as a Worldwide Interoperability for Microwave Access (WiMAX) communication station. In some other broadband multicarrier embodiments, base stations and other network devices may be a 3rd Generation Partnership Project (3GPP), Universal Terrestrial Radio Access Network (UTRAN), or a Long-Term-Evolution (LTE) communication station, although the scope of the invention is not limited in this respect. In these broadband multicarrier embodiments, base stations and mobile stations may be configured to communicate in accordance with an OFDM Access (OFDMA) technique.

In some embodiments, receiver 304 may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, receiver 304 may be configured to receive signals in accordance with the IEEE 802.16-2004 and the IEEE 802.16(e) standards for Wireless Metropolitan Area Networks (WMANs), including variations and evolutions thereof, although the scope of the invention is not limited in this respect as they may also be suitable to transmit and/or receive communications in accordance with other techniques and standards. In some embodiments, receiver 304 may be configured to receive signals in accordance with the UTRAN LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

In some other embodiments, receiver 304 may be configured to receive signals that were transmitted using one or more other modulation techniques such as spread spectrum modulation (e.g., Direct Sequence Code Division-Multiple Access (DS-CDMA) and/or Frequency Hopping Code Division-Multiple Access (FH-CDMA)), Time Division-Multiplexing (TDM) modulation, and/or Frequency Division-Multiplexing (FDM) modulation, although the scope of the embodiments is not limited in this respect.

In some embodiments, receiver 304 may be part of a portable wireless communication device, such as a Personal Digital Assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wire lessly.

Antenna 902 may comprise one or more directional or omni-directional antennas, including, for example, dipole antennas, monopole antennas, patch antennas, loop antennas, micro-strip antennas or other types of antennas suitable for transmission of RF signals. In some embodiments, instead of two or more antennas, a single antenna with multiple apertures may be used. In these embodiments, each aperture may be considered a separate antenna. In some Multiple Input Multiple Output (MIMO) embodiments, antenna 304 may be effectively separated to take advantage of spatial diversity and the different channel characteristics that may result between each of antenna 304 and the antennas of a transmitting station. In some MIMO embodiments, antenna 304 may be separated by up to 1/10 of a wavelength or more.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). A machine-readable medium may include, but is not limited to, FLASH memory, optical disks, Compact Disks-Read Only Memory (CD-ROM), Digital Versatile/Video Disks (DVD), Read Only Memory (ROM), Random Access Memory (RAM), Erasable Programmable Read-Only Memory (EPROM), Electrically Erasable Programmable Read-Only Memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

In one embodiment, a method is performed by a processor device to update a display device and includes detecting an image change to a block of an image for display on a display device, the display device supporting wireless communications, generating a partial update message based on detection of the image change for the block, and transmitting the partial update message to the display device as a wireless signal. The method further includes generating the partial update message by determining a location of the block with respect to a display surface of the display device, retrieving update data associated with the image change to the block, and building the partial update message to include the location of the block and the update data. The partial update message may include a number of blocks field to identify a number of blocks in a plurality of blocks, and at least one block location identifier for each of the plurality of blocks. Each of the at least one block location identifier identifies a unique location on the display surface of the display device. Each of the at least one block location identifier includes coordinates on the display surface of the display device. The method further including entering a dormant mode when no partial update information is detected. The wireless communication network supports a Wi-Fi communication protocol.

In some embodiments, a method for updating a display device includes storing display information for an image to display on a display device, the display device supporting wireless communications, receiving a partial update message as a wireless communication, retrieving partial update information from the partial update message, the partial update information describing an update to the image to display on the display device, merging the partial update information with the stored display information to generate merged information, and displaying the merged information on a display screen of the display device to display the partial update information. The method further includes initiating a timer in response to receipt of each partial update message, the timer having an expiration period, and transitioning the display device to a dormant mode on expiration of the expiration period. The wireless communications may support a Wi-Fi communication protocol.

In some embodiments, an apparatus, includes a memory storage unit, having a main memory unit and a frame buffer. The frame buffer storing image data for display on a display device. The apparatus further including a display engine to retrieve image data from the frame buffer and to identify a change in at least one frame of the image data. The apparatus also including an update unit to generate update information based on the change in the at least one frame of the image data; and a wireless communication unit to transmit the update information to a display device using a wireless communication protocol.

The apparatus may support a wireless communication protocol for Wi-Fi communications. The update unit may be adapted to determine at least one display location for the change in the at least one frame of the image data, the at least one display location identifying at least one block on a display screen. The change includes changes to a plurality of frames of the image data, and wherein the update unit is further to determine a number of blocks corresponding to the plurality of frames. The update information includes the number of blocks, and for each block, the update information includes a block location identifier and corresponding change in image data.

In one example, a display apparatus comprises a memory storage unit, comprising a main memory unit and a frame buffer, the frame buffer to store image data for display on a display screen, a communication unit to receive update information over a wireless communication channel, the update information identifying a change in at least one frame of the image data, an update unit to merge the update information with image data stored in the frame buffer and generate merged information, a display timing controller to control display of the merged information on the display screen, and a display interface to present the merged information to the display screen. The update information includes a block location identifier corresponding to a first block of the image data including a first change in the at least one frame of the image data. The display apparatus having an update unit to merge the update information by replacing data stored in the frame buffer for the first block with the update information identifying the first change, wherein the block location identifier identifies a location on a display screen for display of the image data and wherein the block location identifier includes coordinates on the display screen.

Having disclosed embodiments and the best mode, modifications and variations may be made to the disclosed embodiments while remaining within the scope of the embodiments as defined by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a processor device to update a display device, the method comprising:
   detecting an image change to a block of an image for display on a display device, the display device supporting wireless communications;
   generating a partial update message based on detection of the image change for the block, wherein the partial update message includes a number of blocks field to identify a number of blocks in a plurality of blocks, and at least one block location identifier for each of the plurality of blocks; and transmitting the partial update message to the display device as a wireless signal.

2. The method of claim 1, further comprising:
generating the partial update message by:
determining a location of the block with respect to a display surface of the display device;
retrieving update data associated with the image change to the block; and
building the partial update message to include the location of the block and the update data.

3. The method of claim 2, wherein each of the at least one block location identifier identifies a unique location on the display surface of the display device.

4. The method of claim 2, wherein each of the at least one block location identifier includes coordinates on the display surface of the display device.

5. The method of claim 1, further comprising:
entering a dormant mode when no partial update information is detected.

6. The method of claim 1, wherein the wireless communication network supports a Wi-Fi communication protocol.

7. A method for updating a display device comprising:
storing display information for an image to display on a display device, the display device supporting wireless communications;
receiving a partial update message as a wireless communication, wherein the partial update message includes a number of blocks field to identify a number of blocks in a plurality of blocks, and at least one block location identifier for each of the plurality of blocks;
retrieving partial update information from the partial update message, the partial update information describing an update to the image to display on the display device;
merging the partial update information with the stored display information to generate merged information; and
displaying the merged information on a display screen of the display device to display the partial update information.

8. The method as in claim 7, further comprising:
initiating a timer in response to receipt of each partial update message, the timer having an expiration period; and
transitioning the display device to a dormant mode on expiration of the expiration period.

9. The method as in claim 8, wherein the wireless communications support a Wi-Fi communication protocol.

10. An apparatus, comprising:
a memory storage unit, comprising a main memory unit and a frame buffer, the frame buffer storing image data for display on a display device;
a display engine to:
retrieve image data from the frame buffer, and
identify a change in at least one frame of the image data;
an update unit to generate update information based on the change in the at least one frame of the image data, wherein the update information includes the number of blocks, and for each block, the update information includes a block location identifier and corresponding change in image data; and
a wireless communication unit to transmit the update information to a display device using a wireless communication protocol.

11. The apparatus of claim 10, wherein the apparatus supports a wireless communication protocol for Wi-Fi communications.

12. The apparatus of claim 10, wherein the update unit is further to determine at least one display location for the change in the at least one frame of the image data, the at least one display location identifying at least one block on a display screen.

13. The apparatus of claim 12, wherein the change includes changes to a plurality of frames of the image data, and wherein the update unit is further to determine a number of blocks corresponding to the plurality of frames.

14. A display apparatus, comprising:
a memory storage unit, comprising a main memory unit and a frame buffer, the frame buffer to store image data for display on a display screen;
a communication unit to receive update information over a wireless communication channel, the update information including a number of blocks, and for each block, the update information includes a block location identifier identifying a change in at least one frame of the image data;
an update unit to merge the update information with image data stored in the frame buffer and generate merged information;
a display timing controller to control display of the merged information on the display screen; and
a display interface to present the merged information to the display screen.

15. The display apparatus as in claim 14, wherein the update information includes a block location identifier corresponding to a first block of the image data including a first change in the at least one frame of the image data.

16. The display apparatus as in claim 15, wherein the update unit is further to merge the update information by replacing data stored in the frame buffer for the first block with the update information identifying the first change.

17. The display apparatus as in claim 15, and wherein the block location identifier identifies a location on a display screen for display of the image data.

18. The display apparatus of claim 17, wherein the block location identifier includes coordinates on the display screen.

\* \* \* \* \*